(12) United States Patent
Kerwin et al.

(10) Patent No.: US 11,675,879 B2
(45) Date of Patent: Jun. 13, 2023

(54) APPARATUS AND METHOD FOR OPERATING A DETECTION AND RESPONSE SYSTEM

(71) Applicant: K2Ai, LLC, Oak Park, MI (US)

(72) Inventors: Kevin Richard Kerwin, Birmingham, MI (US); Zachary K. Davis, Waterford, MI (US); Jacob D. O'Boyle, Troy, MI (US)

(73) Assignee: K2AI, LLC, Oak Park, MI (US)

( * ) Notice: Subject to any disclaimer, the term of this patent is extended or adjusted under 35 U.S.C. 154(b) by 405 days.

(21) Appl. No.: 16/796,112

(22) Filed: Feb. 20, 2020

(65) Prior Publication Data

US 2021/0264206 A1 Aug. 26, 2021

(51) Int. Cl.
*G06F 18/2413* (2023.01)
*G06F 9/54* (2006.01)
*G06N 3/08* (2023.01)
*G06V 20/20* (2022.01)
*G06F 18/214* (2023.01)

(52) U.S. Cl.
CPC ........ *G06F 18/24133* (2023.01); *G06F 9/542* (2013.01); *G06F 18/2148* (2023.01); *G06N 3/08* (2013.01); *G06V 20/20* (2022.01)

(58) Field of Classification Search
CPC ...... G06K 9/6257; G06V 20/20; G06F 9/542; G06N 3/08
See application file for complete search history.

(56) References Cited

U.S. PATENT DOCUMENTS

| 9,372,922 | B2 | 6/2016 | Shaashua et al. |
| 10,171,586 | B2 | 1/2019 | Shaashua et al. |
| 2017/0006315 | A1 | 1/2017 | Giladi |
| 2018/0012077 | A1 | 1/2018 | Laska et al. |
| 2018/0330238 | A1* | 11/2018 | Luciw .................. G06V 10/255 |
| 2018/0337820 | A1 | 11/2018 | Chen et al. |
| 2019/0122109 | A1 | 4/2019 | Busch et al. |
| 2019/0197403 | A1* | 6/2019 | Schmidhuber ......... G06N 3/084 |
| 2019/0279345 | A1* | 9/2019 | Kim .......................... G06T 5/00 |

(Continued)

OTHER PUBLICATIONS

International Search Report and Written Opinion for Application No. PCT/US2021/017014 dated May 14, 2021.

(Continued)

*Primary Examiner* — Qun Shen
(74) *Attorney, Agent, or Firm* — Carlson, Gaskey & Olds, P.C.

(57) ABSTRACT

A detection and response system includes a central server having at least one continuously trained neural network and at least one remote system connected to the central server. The at least one remote system includes a first sensor configured to provide an analyzable output corresponding to sensed information to an instanced copy of the continuously trained neural network, and a response system configured to generate a response to the instanced copy of the continuously trained neural network providing a positive detection. A training module is stored on the central server and is configured to update one of the continuously trained neural network and the instanced copy of the continuously trained neural network in response to receiving a data set including the positive detection.

21 Claims, 3 Drawing Sheets

(56) References Cited

U.S. PATENT DOCUMENTS

2020/0285939 A1* 9/2020 Baker .................. G06N 3/0445
2021/0150757 A1* 5/2021 Mustikovela .......... G06V 20/56

OTHER PUBLICATIONS

Tian, Huangshi et al., Continuum: A Platform for Cost-Aware, Low-Latency Continual Learning, Proceedings of the ACM Symposium on Cloud Computing, SOCC '18, Oct. 11, 2018 (2018-10-LL), pp. 26-40, xP055800784, New York, New York, USA, Retrieved from the Internet: URL: https://www.cse.ust.hk/~weiwa/papers/continuum-socc18.pdf.
International Preliminary Report on Patentability for International Patent Application No. PCT/US21/17014 dated Aug. 23, 2022.

\* cited by examiner

APPARATUS AND METHOD FOR OPERATING A DETECTION AND RESPONSE SYSTEM

TECHNICAL FIELD

The present disclosure relates generally to automated detection and response systems, and more specifically to an automated detection and response system including a continuously trained neural network based detection.

BACKGROUND

Detection and response systems typically operate by employing one or more sensors within a given area, and detecting the presence of an object, event or a type of object or event using the output of those sensors. To facilitate this, existing detection and response systems employ static detection criteria within each of the sensors that provides a preprogrammed response to specific sensor feedback. Such detection systems provide only rudimentary detection, and the corresponding responses are commensurate in scope with the rudimentary nature of the detection.

With the advent of neural networks, the ability of sensors to detect specific things or actions has increased. However, due to the trained nature of neural networks, these abilities require substantial amounts of training data, and are locked in once the neural networks are initially trained. As a result the detection and response capabilities of existing sensor systems are limited to the detection and response capabilities at the time of deployment.

SUMMARY OF THE INVENTION

In one exemplary embodiment a detection and response system includes a central server including at least one continuously trained neural network, at least one remote system connected to the central server, the at least one remote system including a first sensor configured to provide an analyzable output corresponding to sensed information to an instanced copy of the continuously trained neural network, and a response system configured to generate a response to the instanced copy of the continuously trained neural network providing a positive detection, and a training module stored on the central server, the training module being configured to update one of the continuously trained neural network and the instanced copy of the continuously trained neural network in response to receiving a data set including the positive detection.

An exemplary method for detecting and responding to conditions includes training a continuously updated neural network at a central server, storing an instanced copy of the continuously updated neural network at one of a remote device and the central server, analyzing sensor data from a sensor contained within the remote device and at least one sensor device connected to the remote device using the instanced copy of the continuously updated neural network, and effecting an action by providing a control signal to the at least one sensor device in response to a positive detection by the instanced copy of the continuously updated neural network.

These and other features of the present invention can be best understood from the following specification and drawings, the following of which is a brief description.

DETAILED DESCRIPTION

Figure 1:
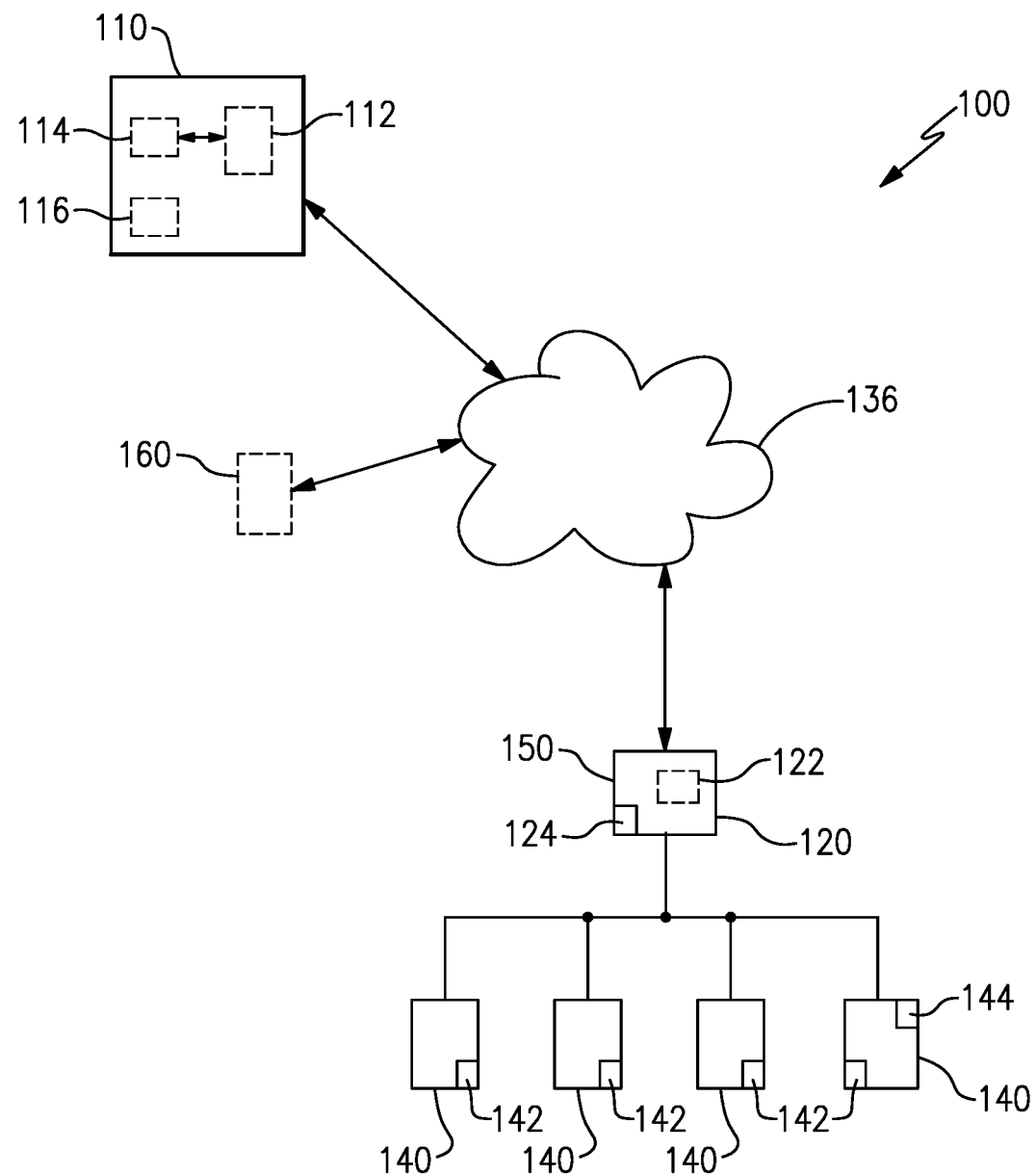
FIG. 1 illustrates a high level schematic view of an exemplary detection and response system.

FIG. 1 schematically illustrates an exemplary detection and response system 100 including a central server 110. A remote system 120 is connected to the central server 110 via a network 136. In some examples, the remote system 120 is a hub interfacing with multiple smart devices including sensors. In alternative examples, the remote system 120 is a smart device including at least one sensor. The smart device in the alternative examples can serve as a hub, as in the first example, or as an independent system. The network 136 can be any conventional network including a cloud based network, cellular data network, the Internet, or any other network of connected devices. Connected to the remote system 120 are multiple sensor devices 140, each of which includes a corresponding sensor 142. By way of examples, the corresponding sensors 142 can include cameras, microphones, light sensors, temperature sensors, gyroscopes, pressure sensors, level sensors, analog sensors, encoders, and the like. In some examples, one or more of the sensor devices 140 can include a response component 144. The response component 144 can include an alarm, a messaging app, a mechanical operation (e.g. activating a linear actuator), and is configured to perform a predetermined response action in response to receiving an indication from the remote system 120 or the central server 110.

In addition to the sensors 142 included in some, or all, of the attached sensor devices 140, the remote system 120 includes a corresponding sensor 122 in some examples. The sensors 122 in the remote system 120 can be any or all of the previously listed sensor types. In one practical implementation, the sensor 122 is an audiovisual recording device. Further, a portion of the sensor devices include controlled systems 124 such as actuators, thermostats, valves, alarms, and the like. The controlled systems 124 are configured to receive control signals from the remote device 120, and implement active responses to a positive detection.

The central server 110 includes a memory, or other non-transitory computer storage, storing a continuously updated neural network 112 configured to detect and respond to a condition occurring. Neural networks in general are sets of algorithms designed to recognize patterns in sensor data and provide an output indicating such a recognition. Neural networks are trained by providing a base neural network with a set of training data including data verified as including the condition to be detected and data verified as not including the condition to be detected. By way of example, if the condition is the presence of a dog, the training data provided to the neural network includes sensor outputs verified as indicating a presence of a dog (a positive detection), and sensor outputs verified as indicating no presence of a dog (a negative detection).

Based on the training data, the neural network determines patterns in the specific sensor data types and uses those patterns to establish algorithms for detecting or not detecting the condition within the data type. The data types used for the training and detection in a neural network can be any sensor type such as video sensors, audio sensors, cameras, and the like and the specific algorithms and rules established by the neural network are dependent on the type of neural network implemented.

The neural network 112 can be trained to detect general elements, such as specific animal types (pets, rodents, geese, and the like), people entering a restricted area such as a pool, locked room, or another defined area, delivery of a package to a specified area or similar conditions. In addition, some neural networks 112 can be trained to detect specific elements, such as breeds of dogs, a specific pet, individual people, weapons and/or weapon types, and the like. The specificity of the detection capabilities of the neural network 112 depend on the quantity and quality of training data provided to the training module 114 during the initial training of the neural network 112.

Existing detection systems are limited by the amount of training data initially used to train the neural networks. In addition practical implementations of existing remote systems using neural networks are limited to the trained neural network that is available at the time of manufacture. Further, existing systems including a capability to update the neural network in a remote system are limited in training to training data possessed by the manufacturer of the system.

In addition to the continuously updated neural network 112, the central server 110 includes a training module 114 and an authentication module 116. The training module 114 receives suspected detections from the remote device 120, as well as from the sensor devices 140 connected to the remote device 120. The suspected detections are provided to the authentication module 116. The authentication module 116 verifies the accuracy of the detections as being either accurate or inaccurate, and a corresponding tag is applied to the detection data. In one example, the suspected detections include positive detections (i.e., the presence of a target, or the occurrence of an event) or negative detections (i.e. the absence of a target or the non-occurrence of an event). This results in a validated data set include four configurations of tags for any given data: 1) Accurate Positive, 2) Inaccurate Positive, 3) Accurate Negative, and 4) Inaccurate Negative. Once tagged, the central server 110 adds the validated detections to a set of training data stored within the non-transitory memory of the central server 110. The validation of any particular data element can be performed either automatically by the central server 110 in a sufficiently trained system, manually by a technician during initial training of the system, or a combination of both. As used herein a validated detection is any captured data that is validated as either containing (a positive detection) or not containing (a negative detection) an element that is being detected. Validated detections are generated at the remote device 120 by allowing a user of the remote device to verify the accuracy of positive and negative detections through a user interface.

Throughout operation of the remote system 120, the validated detections are transmitted through the network 136 back to the central server 110, thereby allowing the central server 110 to continuously build the set of training data. The validated detections can be uploaded to the central server 110 continuously as they are made, or updated periodically in conjunction with scheduled updates of the remote device 120.

The training module 114 receives the validated data, including the validated positive detections and validated negative detections, and updates the training data set for the neural network 112. The updated training data is then used to retrain, or update the training of, the neural network 110. In addition to the data passed through the single illustrated remote device 120, a practical embodiment of the detection and response system 100 will include multiple remote devices 120, with each remote device 120 passing through its corresponding validated detections, thereby allowing the neural network 112 to be continuously retrained from multiple remote devices 120, and the retrained neural network 120 to be sent to the remote devices 120, thereby allowing new instanced copies 122 of the neural network 112 to be used by the remote device 120 or leased off of a main server, depending on the specific configuration.

Each of the remote devices 120 also includes a memory storing the instanced copy 122 of the continuously updated neural network 112. The instanced copy 122 is a copy of the neural network 112 including the most recent retraining from the central server 110. In some examples, the instanced copy 122 is updated periodically when the remote device 120 checks in with the central server 110. In alternative examples, the instanced copy 122 is updated continuously, or in response to a user activating an update.

In some examples, the central server 110 can further include an authentication module 116. The authentication module 116 authenticates a connection with a remote device 120, thereby ensuring that the data received from the remote device 120 is verified and ensuring that the remote device 120 is authorized to receive a new or updated instanced copy 122. In some examples the authentication module 116 can be, or can include, a payment processing function and the authentication of the remote device 120 includes verification that the remote device 120 has made a payment authorizing access. In another example, the verification module 116 can include a list of passwords, mac addresses, ip addresses, or any other unique identifiers and only remote devices 120 possessing a unique identifier in the list are authorized.

In yet another example, the authentication module 116 can include a two factor authentication system, where the authentication module 116 transmits a passcode through the network 136 to another device 160, such as a mobile phone, tablet, or fob. The user in possession of the other device 160 then enters the passcode into the remote device 120, which transmits the ID to the central server 110, providing authentication.

Within the remote device 120, the instanced copy 122 is a fully functional detection and response neural network copy of the continuously trained neural network 112. The instanced copy 122 is configured to detect a condition (e.g. a package has been delivered to a designated delivery zone) and affect a response in at least one of the multiple sensor devices 140 (e.g. an automatic doorbell ring). In some examples the response is a simple notification, such as an email or text to the personal device 160. In other examples, the response is one or more controller outputs that is configured to cause a physical response, such as opening a pet door or engaging a sprinkler, in a sensor device 140 connected to the remote device 120.

Figure 2:
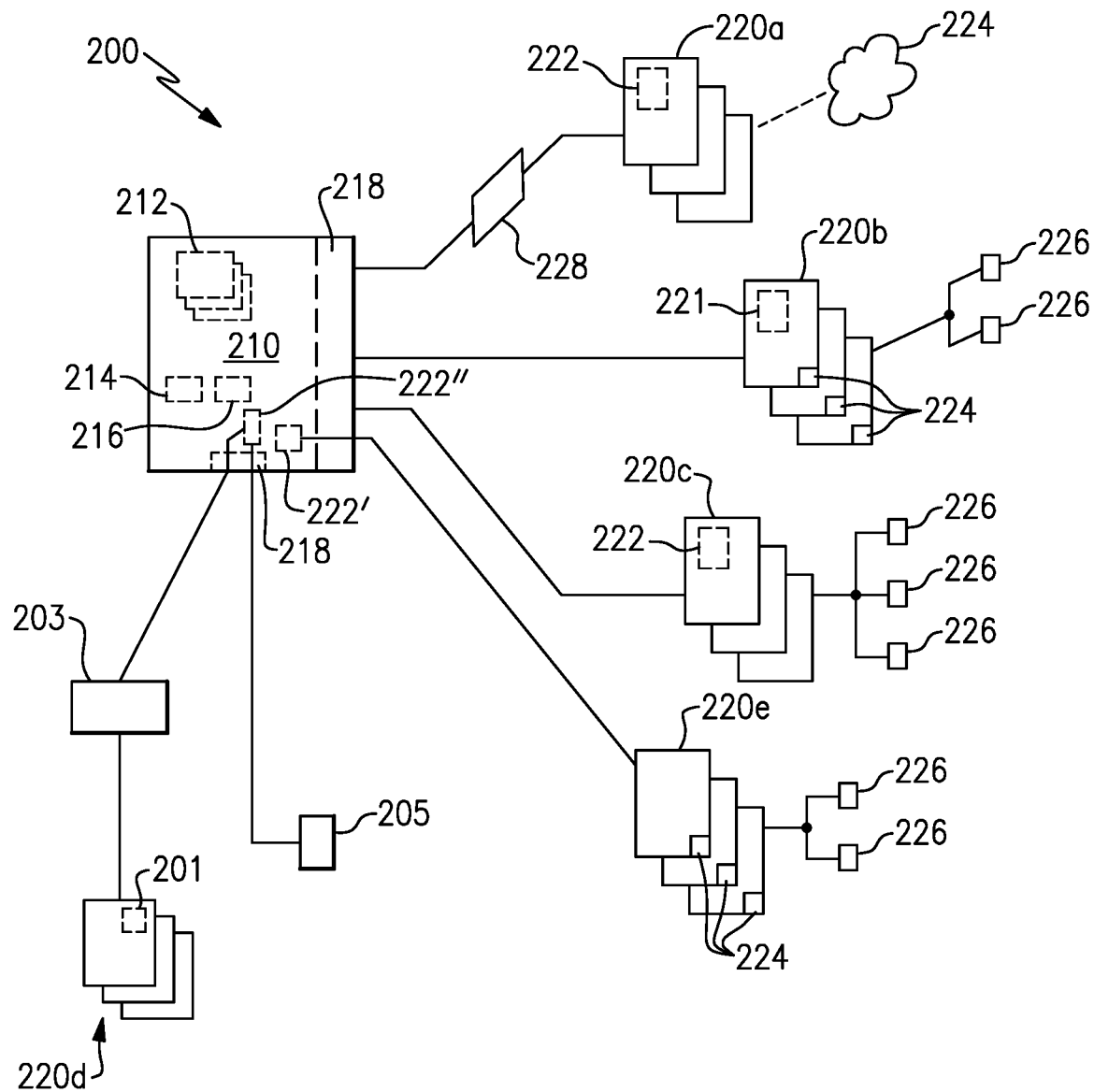
FIG. 2 schematically illustrates an exemplary system including multiple remote device configurations.

With continued reference to the general system of FIG. 1, FIG. 2 schematically illustrates an example implementation of a detection and response ecosystem 200 utilizing multiple remote devices 220a, 220b, 220c, 220d, 220e connected to the central server 210 in different configurations.

The central server 210 includes multiple continuously updated neural networks 212, a training module 214 and an authentication module 216, each of which operates in the same general fashion as the corresponding modules of FIG. 1. Each of the multiple neural networks 212 is configured to detect a different condition and/or to utilize a different set or type of sensor information in the detection. During configuration of any of the remote devices 220a, 220b, 220c, 220d, 220e the user of the remote device 220a, 220b, 220c, 220d, 220e can configure the remote device 220a, 220b, 220c, 220d, 220e to utilize the neural network 212 corresponding to whatever sensors and/or data streams are provided to the remote device 220a, 220b, 220c, 220d, 220e. In addition, the central server 210 includes an application programming interface (API) 218, through which each of the remote devices 220a, 220b, 220c, 220d, 220e connects to the central server 210.

The first set of remote devices 220a include an instanced copy 222 of one of the neural networks 212, and are connected to one or more multimedia streams via a networked connection 224. The connection between the remote device 220a and the central server 210 is via an application 228 configured by an end user to interface with the central server through the API 218. The custom application 228 allows the end user of the remote device to customize or filter the detection and data provided to and from the remote devices 220a. In some examples, the custom application 228 allows the end user to provide initial training data to create a new continuously updated neural network 212 at the central server. In other examples, the custom application 228 allows the end user of the remote device 220a to configure what conditions within a multimedia stream will trigger a positive detection, and what conditions will trigger a negative detection.

In the second configuration, the remote devices 220b include sensors 224 and are connected to multiple sensor devices 226 The second set of remote devices 220b do not include the instanced copy of the neural network 212 at the remote device. Instead, a processor 221 within the remote devices 220b operates as an aggregator of all the sensor information provided from the sensors 224 and the sensor devices 226. The aggregated information is provided back to the central server 210 through the API 218, either directly or through third party servers. During setup of the remote devices 220b, an instanced copy of the corresponding neural network 212 is created at the central server 210, and during operation of the remote device 220b the aggregated data is passed through the instanced copy at the central server. Positive detections by the instanced copy of the neural network 212 are provided back to the remote device 220b. In response to the positive detections, the remote devices 220b effect a preconfigured action in at least one of the sensor devices 226. In the configuration of the remote devices 220b, the aggregated data is utilized to further train the neural networks 212 directly.

The third set of remote devices 220c are configured as illustrated in the example of FIG. 1, with the remote devices 220c including an instanced copy 222 of the continuously updated neural network 212. And operate in the same fashion.

In a fourth set of remote devices 220d, each of the remote devices 220d includes a smart sensor 201 that is configured to provide data back to a third party server 203 via any communication system. By way of example, each of the remote devices can be a smart speaker/microphone and the third party server can be a third party system configured to interpret commands predicated by a passphrase. When authorized by an end user, the third party server 203 operates as a pass through and passes the collected data to a locally stored instanced copy 222 of the neural network 212 at the central server 200 through the API 218. The locally stored instanced copy 222 operates in the same manner as the previously described locally stored instanced copies. When a validated detection occurs, the locally stored instanced copy 222" provides an alert to a registered device 205 including an application connected to the central server through the API 218. By way of example, the registered device 205 can be a smartphone, a tablet, a computer, or any other remote device able to run the application and receive alerts. In alternative embodiments, the registered device 205 can be any component connected to the central server 203 and including a sensor device 226 configured to trigger an automatic response to a detection received from the central server 200.

In a fifth set of remote devices 220e, each of the remote devices 220e includes one or more sensors 224, with the remote devices 220e being further connected to sensor devices 226 such as smart devices, motion sensors, video cameras and the like. As with the example of 220b, each of the remote devices 220e includes a processor 221 configured to aggregate the sensor data and provide the sensor data to an instanced copy of the trained neural network central server 201 through the API 218. In the example of the fifth set of remote devices 220e, the operation and configuration of the instanced copy of the neural network is provided by the operator of the central server and connections to the instanced copy of the neural network are licensed.

In the example of FIG. 2, each of the remote devices 220a, 220b, 220c, 220d, 220e contributes to the continuous training of the neural networks 212, with an increase in remote devices 220a, 220b, 220c, 220d, 220e increasing the quantity of connected remote devices 220a, 220b, 220c, 220d, 220e increases the rate at which the continuously updated neural network 212 can be updated and further increases the detection and response capabilities of the system 200. By way of example, the system 200 can include at least 100 connected remote devices 220a, 220b, 220c, 220d, 220e thereby providing a sufficient number of positive and negative detections to continuously update the neural network 212.

Figure 3:
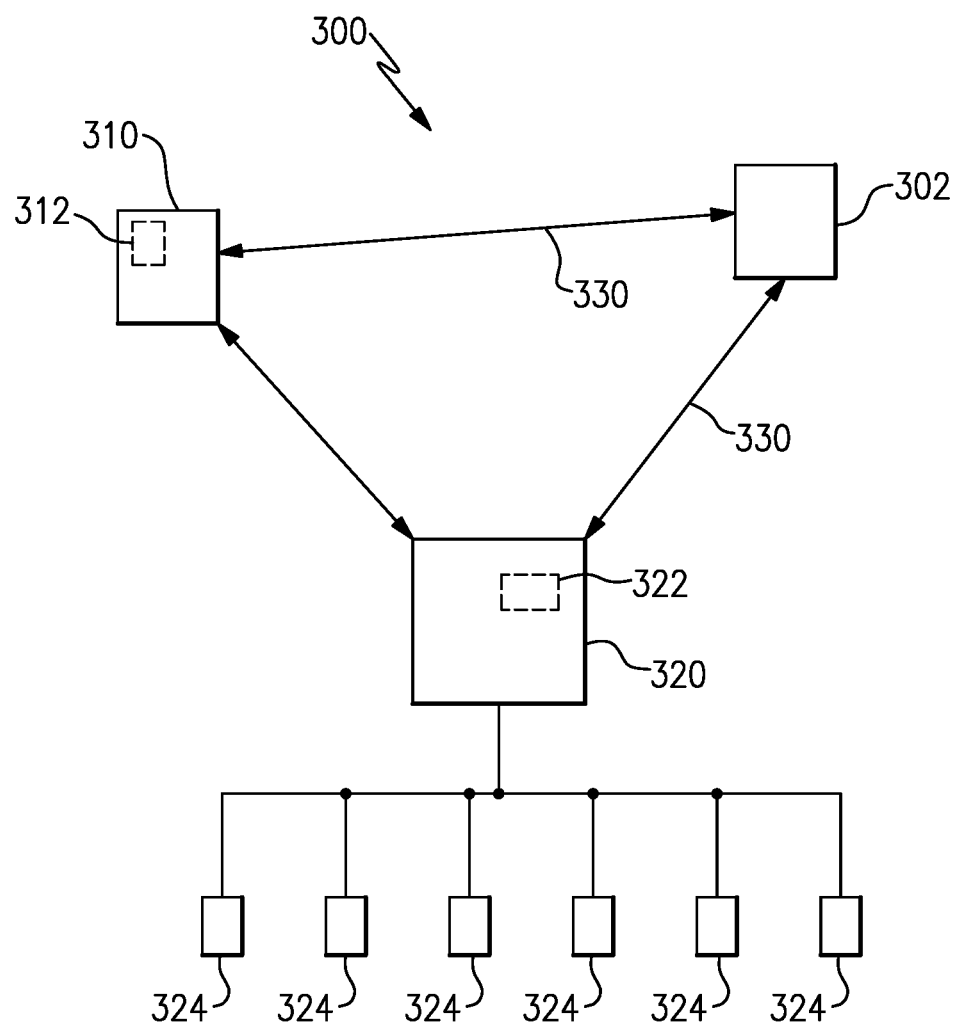
FIG. 3 schematically illustrates an exemplary implementation including an emergency services connection.

With continued reference to FIGS. 1 and 2, FIG. 3 illustrates an exemplary system 300 including a connection to an emergency services system 302. In alternative examples, the external system can be other systems and the implementation is not limited to emergency services. By way of example, the emergency services system 302 can include an emergency police line, fire station, or other emergency response system. The remote device 320 includes an instanced copy 322 of a neural network 312 configured to detect an emergency such as an unauthorized weapon, an intruder, a fire, or a similar condition using the sensor data from any of the included sensor 324 and the sensors in the remote device 320.

In the example of FIG. 3, if either of the central server 310 or the remote device 320 provides a positive detection, a notification is provided to the emergency services system through network connections 330. In some examples, the central server 310 includes a module configured to allow a user to manually review and triggers and ensure that the correct emergency service 302 is notified and/or that an actual emergency is present. The emergency services system 302 evaluates the detection, and provides a corresponding action. In some examples, the evaluation can include a manual review of the sensor data by an emergency services personnel, and in other examples the evaluation can include authentication of the data source (e.g. ensuring that the information is received from one of the central server 310 and the remote device 320). In yet further examples, a combination of the above authentication methods can be performed.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A detection and response system comprising:
    a central server including at least one continuously trained neural network;
    at least one remote system connected to the central server, the at least one remote system including a first sensor configured to provide an analyzable output corresponding to sensed information to an instanced copy of the continuously trained neural network, and a response system configured to generate a response to the instanced copy of the continuously trained neural network providing a positive detection;
    the at least one remote system including a network of sensor devices and the at least one remote system being configured to analyze data outputs from each of the sensor devices using the instanced copy of the continuously trained neural network, wherein the network of sensor devices includes at least one controlled component, and the generated response includes at least one control signal controlling a physical operation of the controlled component; and
    a training module stored on the central server, the training module being configured to update one of the continuously trained neural network and the instanced copy of the continuously trained neural network in response to receiving a data set including the positive detection;
    wherein the at least one controlled component includes a plurality of distinct controlled components, including at least two distinct types of controlled components, and including at least one of an actuator, a thermostat, a valve, and an alarm;
    wherein the at least one control signal includes a distinct control signal corresponding to each of the controlled components in the plurality of controlled components, and the distinct control signals effect distinct physical actions; and
    wherein the plurality of controller components includes a valve and wherein the physical operation of the controlled component is one of transitioning the valve from a closed state and transitioning the valve from an open state.

2. The detection and response system of claim 1, wherein the at least one remote system is connected to the central server via one of a direct data connection, a networked data connection, and a cloud data connection.

3. The detection and response system of claim 1, wherein the training module is configured to periodically receive a set of verified detections communicated to the central server from the at least one remote system.

4. The detection and response system of claim 3, wherein the training module includes an accuracy verification system, and a retraining system at the central server.

5. The detection and response system of claim 4 wherein the accuracy verification system is configured to verify an accuracy of each detection and flag each detection in the quantity of received detections as one of accurate and inaccurate, and thereby generate the set of verified detections.

6. The detection and response system of claim 5, wherein the accuracy verification system includes a manual review of each detection in the quantity of received detections.

7. The detection and response system of claim 5, wherein the accuracy verification system includes an automated review of each detection in the quantity of received detections.

8. The detection and response system of claim 4, wherein the set of verified detections includes accurate positive detections, inaccurate positive detections, accurate negative detections and inaccurate negative detections.

9. The detection and response system of claim 1, further comprising at least one notification system connected to the central server, and wherein the central server includes a notification module configured to direct an accurate positive detection from the at least one remote system to the at least one notification system.

10. The detection and response system of claim 9, wherein accurate positive detection is directed to the at least one notification system via a network connecting the central server and the notification system.

11. The detection and response system of claim 9, wherein the accurate positive detection is directed to the at least one notification system through the remote device.

12. The detection and response system of claim 9, wherein the at least one notification system is an emergency services system.

13. The detection and response system of claim 1, wherein the continuously trained neural network is configured to re-train in real time.

14. The detection and response system of claim 1, wherein the continuously trained neural network is configured to retrain in response to a trigger condition being met, wherein the trigger condition is one of an elapsed time since a previous retraining and a quantity of received detections.

15. The detection and response system of claim 14, wherein the quantity of received detections includes positive detections and negative detections.

16. The detection and response system of claim 1, wherein the instanced copy of the continuously trained neural network is disposed at the at least one remote system.

17. The detection and response system of claim 1, wherein the instanced copy of the continuously trained neural network is disposed at the central server.

18. The detection and response system of claim 17, wherein the remote system is connected to the central server via a third party server, and the third party server includes a data aggregation module.

19. The detection and response system of claim 18, further comprising a notification system distinct from the at least one remote system and connected to the central server.

20. The detection and response system of claim 1, wherein the plurality of the controlled components includes an actuator and wherein the physical operation of the controlled component is actuation of the actuator.

21. The detection and response system of claim 1, wherein the operation of the controlled component is a physical action of the controlled component.

* * * * *